July 7, 1970     S. G. CHRISTISON     3,519,247
FREEWHEEL FINAL DRIVE ASSEMBLY
Filed March 25, 1968     2 Sheets-Sheet 1
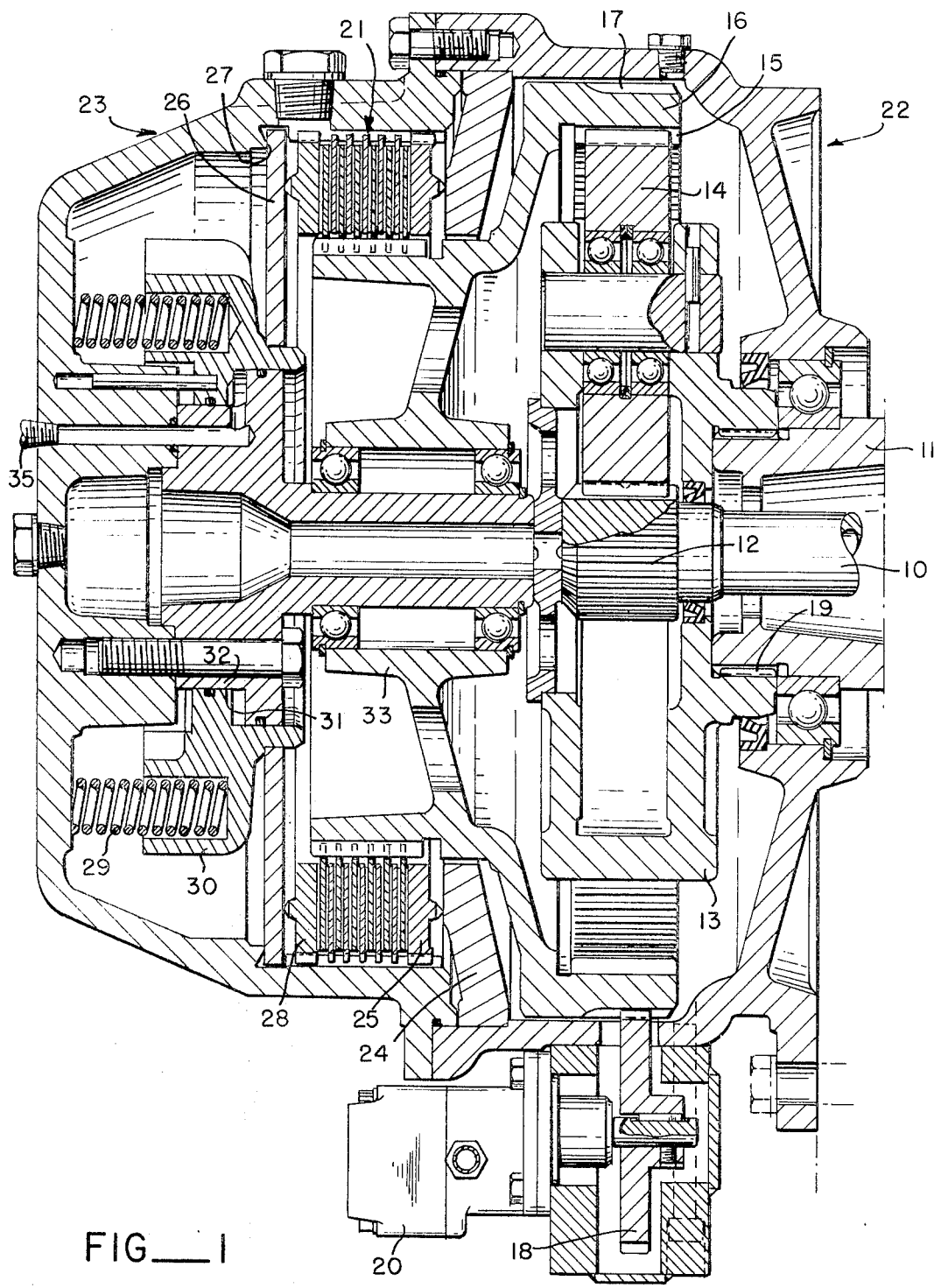
FIG__1
INVENTOR.
SOMMERVILLE G. CHRISTISON
BY
ATTORNEYS

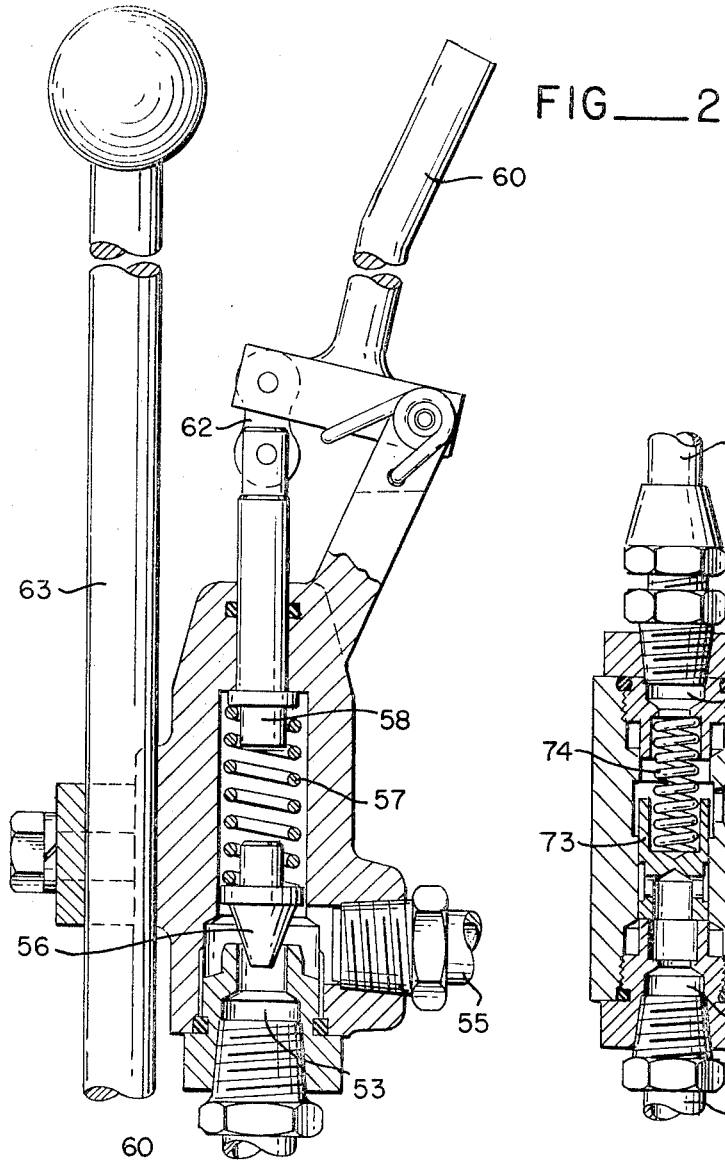
FIG__2
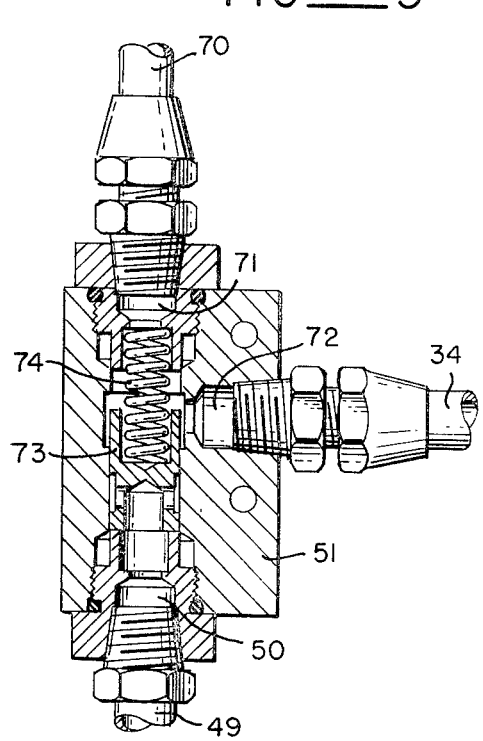
FIG__3
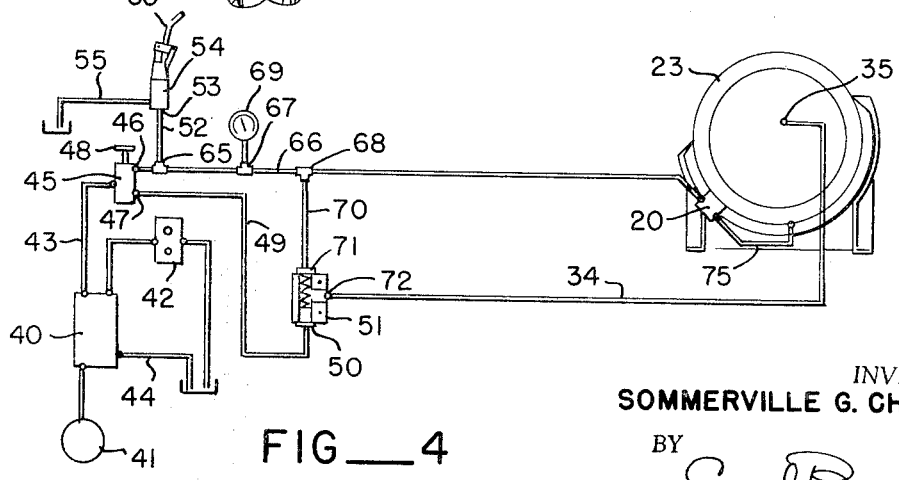
FIG__4
INVENTOR
SOMMERVILLE G. CHRISTISON
BY *Seed, Berry & Downey*
ATTORNEYS United States Patent Office 3,519,247
Patented July 7, 1970

3,519,247
FREEWHEEL FINAL DRIVE ASSEMBLY
Sommerville G. Christison, North Surrey, British Columbia, Canada, assignor to Gearmatic Co. Ltd., North Surrey, British Columbia, Canada, a corporation of Canada
Filed Mar. 25, 1968, Ser. No. 715,611
Int. Cl. B66d 1/40
U.S. Cl. 254—150                    7 Claims

ABSTRACT OF THE DISCLOSURE

A planetary reduction final drive for a reversible winch and having a multi-disc brake functional to a ring gear included in the planetary gearing, the brake being spring applied and hydraulically released with its control circuit characterized in that a load carried by the winch can be given either a controlled lowering or an emergency free fall.

---

The invention relates to a reduction-geared hydraulic winch including, in its reduction gearing, at least one gear normally held against rotation and which, by being wholly or partially freed, permits the controlled lowering of a load carried by the winch. The principal object of the invention is to provide, for the arrestation of said gear, a multi-disc brake which is spring-applied and hydraulically released, and to so engineer the hydraulic control circuit for the brake that the brake may be instantly released, under the applied force of a hydraulic pressure of high intensity, under an emergency condition dictating a free fall of a load, and gradually released under the applied force of a hydraulic pressure low by comparison with said emergency pressure when a normal controlled smooth lowering of the load is being performed.

It is a further important object of the invention to provide a winch of the described character which automatically compensates the break-releasing hydraulic pressure to the weight of the particular load which is being lowered, and to changes in the friction values of the brake reflecting a static or a dynamic condition.

These and other objects and advantages will appear and be understood in the course of the following description and claims, the invention consisting in the novel construction and in the adaptation and combination of parts hereinafter described and claimed.

In the accompanying drawings:

FIG. 1 is a fragmentary longitudinal vertical sectional view illustrating a final reduction drive embodying preferred teachings of the present invention.

FIG. 2 is a vertical sectional view, drawn to a scale enlarged from that of FIG. 1, detailing a control valve incorporated in a hydraulic circuit for the multi-disc brake.

FIG. 3 is a vertical sectional view, using a somewhat smaller scale, detailing a check valve which is provided in the system; and FIG. 4 is a schematic view illustrating the hydraulic circuit.

The structure of the present invention is designed to replace the reduction final drive in a hydraulic winch like or similar to that shown and described in U.S. Pat. No. 2,959,396, namely a winch in which journal bearings for the two ends of its spooling drum are carried by front and rear gear housings. Received in the front housing is a hydraulic motor serving as a prime mover for the winch, together with a planetary gear system driven from the prime mover and driving a transfer shaft which extends through a hollow center of the drum into the rear gear housing. The reduction final drive is received in the rear gear housing and is a planetary system having its input end driven from the transfer shaft and its output end drive-coupled to the spooling drum.

In the present drawings the transfer shaft is denoted by the numeral 10 and the drum by 11. A sun gear 12 for the planetary final drive is provided upon the rear end of the transfer shaft, and a spider 13 for the planet gears 14 of such final drive is splined, as at 19, to a hub prolongation of the spooling drum. The planet gears are in mesh with the sun gear and the internal teeth 15 of a ring gear 16.

The ring gear is journaled for rotation and also has external teeth 17 meshing a drive pinion 18 for a metering pump 20. The function of the metering pump will be understood as the description proceeds, but suffice it to here say that it is a compensator for changes in the static and dynamic friction values of a multiple-disc brake 21 which operates either to completely or partially arrest the rotation of the ring gear 16 or to make the same freewheeling. When made free-wheeling, the spooling drum becomes isolated from the prime mover and perforce will spin freely by any pull force exerted upon a cable running out from the drum.

The casing in which said planetary final drive is housed has front and rear shell sections 22 and 23. An annular pressure plate 24 is caught between a shoulder of the front shell 22 and a lip of the rear shell 23 by the act of bolting the two shell sections together, and acts to take the thrust of a front clamp plate 25 of the brake assembly. Quadrants 26 fulcrumed upon a shoulder 27 of the rear shell 23 are levered against a rear clamp plate 28, so as normally to set the brake, by magnified action of spring 29, the spring force being applied through the piston 30 of a hydraulic piston-cylinder assembly. The cylinder 31 is produced between stepped portions of a neck section 32 located centrally within the gear housing and made rigid with the housing's rear shell 23. A forward prolongation of this neck section provides a journal mounting for a hub 33 of the ring gear 16.

Bores are provided in the shell 23 and the neck section 32 leading to the cylinder 31 from a back wall port. Pressure fluid supplied through a hose 34 to a fittings 35 for said port works counter to the pressure of the springs 29 to release the brake.

The control circuit here illustrated is for a crane application, and has a Fawick or other like or suitable flow divider 40 splitting the output from a pump 41 between the crane's slewing control valve 42 and a side line 43. No more than a small part, say 1½ g.p.m., of the pump's output need be charged into said side line. A relief valve set at say 550 p.s.i. dumps through a connection 44.

Denoted by 45 is a selector valve equipped with a detent-positioned shuttle spool which establishes communication from a single front-side port to either of two back-side ports 46 or 47. The spool normally is positioned so that the pressure fluid is supplied to the back-side port 46. The other back-side port 47 is an emergency port and the spool is shifted, so that pressure fluid is diverted to the emergency port, by manual operation of a pedal 48. This latter port 47 connects by a line 49 with an end port 50 of a check valve 51 hereinafter to be described.

Port 46 connects by a hose 52 with the port 53 of a control valve 54 for the brake 21. This control valve is a type of relief valve which is normally open and manually operated, having a valve element 56 yieldingly urged by a spring 57 toward a closed position against the force of the supplied pressure fluid. Fluid passing the valve element returns by hose 55 to the reservoir from which the pump 41 is supplied. The spring pressure is augmented by controlled squeezing of a hand lever 60 connecting through a link 62 with an axially movable pin 58 which provides a thrust purchase for the spring. The control valve desirably is clamped to a speed-and-direction control lever 63 for the winch so that the operator may control with a single hand both (1) said speed and direction and (2) the brake.

A T-fitting 65 is included in the line 52 and connects by a side branch with a line 66 which leads to the metering pump 20 and also has two T-fittings 67 and 68 within its length. The side branch of the fitting 67 leads to a pressure gauge 69.

The side branch of the T-fitting 68 connects by a hose line 70 with a port 71 provided in the check valve 51 at the end thereof opposite the end port 50. The check valve also connects by a side port 72 with the hose 34 which leads to the brake-release port of the gear housing. Port 72 normally is in communication with the port 71 and is isolated from the port 50 by a spring-pressed shuttle spool 73. The spring 74 is compressed, and ports 50 and 72 brought into communication, by said emergency depression of the pedal 48 of the selector valve 45, so as responsively to divert the flow of pressure fluid and channel the same to the port 47 while coincidently isolating the port 46. The full governed pressure of the pump 41 (i.e. the relief valve setting of 500–550 p.s.i. at the flow divider 40) is now passed through the connecting hoses 49 and 34 to the cylinder 31 of the final drive's brake-release system. The high-pressure passed into said cylinder 31 instantly releases the brake 21 against the spring load, so that the ring gear 16 spins and causes a load then carried by the winch line to drop freely to the ground. In this emergency free fall the oil flow is prevented from reaching the metering pump 20 by the spool 73 of the valve 51. It is important that the spool of the selector valve 45 not be returned to its normal position until the load has reached the ground and the drum is stationary.

It will be apparent that the brake release pressure must be regulated if good control is to be obtained when lowering a load by the use of the free-wheel brake 21. The oil pressure required at the piston 30 varies according to the load, and also changes in proportion to the static and dynamic friction values of the brake. The metering pump 20 controls this pressure automatically. As soon as the brake, by squeeze pressure applied to the control-valve lever 60, is released sufficiently to allow the ring gear 16 to rotate, the metering pump is driven by the pinion 18 and meters part of the oil supply out of the pressure side of the circuit into a line 75. While not here illustrated, this metered output provides internal lubrication for the two gear housings of the winch before returning to the reservoir for the pump 41.

The speed at which a load is lowered is proportional to the degree to which the operator augments the pressure of the spring 57 by the squeeze motion given to the control lever 60. As the spring pressure increases, the flow of oil past the valve element 56 is restricted to a greater extent. A slight increase in squeeze pressure increases the oil pressure upon the piston 30, causing an increase in the rotation of the ring gear 16 and a larger flow of oil through the metering pump. When the control lever 60 is moved to its full extent, all the oil requires to pass through the metering pump. In this condition a maximum and uniform load-lowering speed is obtained.

When a load is being lowered with the free-wheel brake, it is important that the control lever 60 be moved gradually. Sudden movement of the lever will cause a pressure surge which results in the load being lowered at an uneven speed. Squeeze pressure upon the control lever must also be slacked off slowly if the load is to be brought to a smooth stop.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. In combination with the spooling drum of a hoisting winch, a power-driven drive member, a planetary gear system including a ring gear and passing a reduction drive from said drive member to the drum, a brake for the ring gear spring-set so as normally to arrest the rotation thereof, a means expandible by pressure of fluid delivered thereto and when expanded countering the force of the spring to release the brake and allow the ring gear to turn, a fluid pump, and a control circuit having manually governed controls therein by the operation of which the pumped fluid normally is delivered to said expandible means in a manner such that the speed of rotation of the ring gear is accurately controlled so that a load carried by the winch may be gradually lowered, means actuated by said ring gear to govern the brake release pressure in proportion to the rotary speed of the ring gear and emergency means manually operable to apply instant and full brake release pressure and permit free rotation of the spooling drum.

2. The combination claimed in claim 1 in which said planetary gear system functions as the final reduction drive in a reversible hydraulic winch also having a primary reduction drive.

3. The combination claimed in claim 1 having between the spring and the brake a lever magnifying the force of the spring.

4. The combination claimed in claim 1 wherein said means actuated by said ring gear is a metering pump and wherein said metering pump is driven by a gear directly meshing with said ring gear.

5. The combination claimed in claim 4 having in the control circuit separate controls for said normal and emergency operation and characterized in that the emergency control isolates the metering pump and directs a full flow of the pumped fluid to the expandible means.

6. The combination claimed in claim 4 having in the control circuit separate controls for said normal and emergency operation, with the emergency control occupying an intervening position between the fluid pump and the normal control and acting when operated to block out both the normal control and the metering pump.

7. The combination claimed in claim 4 in which the normal control is in the nature of a relief valve, and with the emergency control occupying an intervening position between the fluid pump and said normal control and when operated acting to block out the normal control.

References Cited
UNITED STATES PATENTS

| 2,749,772 | 6/1956 | O'Malley | 74—785 |
| 2,959,396 | 11/1960 | Lawrence | 254—172 |
| 3,325,149 | 6/1967 | Woodward | 254—187 |

HARVEY C. HORNSBY, Primary Examiner

U.S. Cl. X.R.

74—785; 254—186